(12) United States Patent
Kim

(10) Patent No.: US 6,408,709 B2
(45) Date of Patent: Jun. 25, 2002

(54) CABLE BLOCK-LOCKING MECHANISM FOR DUAL MODE SHIFT LEVER UNIT

(75) Inventor: Hyung-Suk Kim, Kyungki-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/737,610

(22) Filed: Dec. 14, 2000

(30) Foreign Application Priority Data

Dec. 28, 1999 (KR) .............................................. 99-63651

(51) Int. Cl.[7] .......................... F16H 59/02; F16H 63/36
(52) U.S. Cl. ................ 74/473.18; 74/473.24; 74/483 R; 74/483 K
(58) Field of Search .......................... 74/473.18, 473.24

(56) References Cited

U.S. PATENT DOCUMENTS 5,622,079 A * 4/1997 Woeste et al. ................ 74/335
5,791,197 A * 8/1998 Rempinski et al. ...... 74/473.18
6,196,080 B1 * 3/2001 Lee ........................... 74/473.18

* cited by examiner

Primary Examiner—Allan D. Herrmann
(74) Attorney, Agent, or Firm—Christie, Parker & Hale, LLP

(57) ABSTRACT

A cable block-locking mechanism of a dual mode shift lever unit having a shift lever pivotally connected to a pivot shaft in a lever housing via a lever bracket provided at a lower end of the shift lever, a rotation member rotationally mounted on the pivot shaft, and a cable block pivotally mounted on the pivot shaft outside the lever housing. The cable block-locking mechanism includes a stud slidably mounted to the cable block for selectively connecting the cable block with the lever housing, a push rod formed on the lever bracket for depressing the stud so as to release the cable block from the lever housing in an automatic mode, and a return spring mounted around the stud for returning the stud to its place so as to couple the cable block with the lever housing in a manual mode.

4 Claims, 4 Drawing Sheets

CABLE BLOCK-LOCKING MECHANISM FOR DUAL MODE SHIFT LEVER UNIT

CROSS-REFERENCE TO RELATED APPLICATION

This application claims priority of Korea patent Application No. 99-63651, filed on Dec. 28, 1999.

BACKGROUND OF THE INVENTION (a) Field of the Invention

The present invention relates to a dual mode shift lever unit for an automatic transmission, and in particular, to a cable block-locking mechanism for a dual mode shift lever unit having automatic and manual modes, which is capable of reliably locking a cable block at a D range in manual mode.

(b) Description of the Related Art

Recently, high-class automobiles have tended to be equipped with a dual mode transmission mechanism for satisfying driver's whimsical tastes to sometimes take the pleasure of manually shifting the transmission like a sports car, and sometimes to enjoy ride quality of an automatic operation of a high-class sedan.

This kind of dual mode shift unit provides two shift modes, i.e., an automatic mode and a manual mode, such that an indicator panel is formed having a guide groove separating respective mode portions as shown in FIG. 1.

The dual mode shift lever unit comprises a shift lever slidably inserted into the guide groove formed on the indicator panel and a cable block connected to a transmission manual valve by a cable.

Normally when the shift lever unit is in the automatic mode, the shift lever is fixedly connected to the cable block by a projection formed on the shift lever being inserted into a hole formed on one side of the cable block such that the transmission manual valve is responsively operated by shift lever manipulation.

On the other hand, when the shift lever unit is in the manual mode, the shift lever is separated from the cable block by the projection of the shift lever being pulled from the hole of the cable block such that the shift lever freely moves.

In this manual mode, the cable block must be locked at a drive range and the locking is performed by a detent spring formed on one side of the cable block and a detent plate formed on the shift lever unit housing.

However, this conventional locking mechanism for the dual mode shift lever unit has a drawback in that since the locking of the cable block at the drive range is performed by the meager elastic force of a detent spring together with a detent plate, the locking is unreliable during vibration and especially when a vehicle experiences exterior impacts.

SUMMARY OF THE INVENTION

The present invention has been made in an effort to solve the above problems of the prior art.

It is an object of the present invention to provide a cable block-locking mechanism of a dual mode shift lever unit which is capable of reliably locking a cable block at a D range during manual mode driving.

To achieve the above object, the cable block-locking mechanism for a dual mode shift lever unit including a shift lever pivotally connected to a pivot shaft in a lever housing via a lever bracket provided at a lower end of the shift lever, a rotation member rotationally mounted on the pivot shaft, and a cable block pivotally mounted on the pivot shaft outside the lever housing, comprises a stud slidably mounted to the cable block for selectively connecting the cable block with the lever housing, a pushrod formed on the lever bracket for depressing the stud so as to release the cable block from the lever housing in an automatic mode, and a return spring mounted around the stud for returning the stud to its place so as to couple the cable block with the lever housing in a manual mode.

BRIEF DESCRIPTION OF THE DRAWINGS

The accompanying drawings, which are incorporated in and constitute a part of the specification, illustrate an embodiment of the invention, and together with the description, serve to explain the principles of the invention.

DETAILED DESCRIPTION OF THE PREFERRED EMBODIMENTS

A preferred embodiment of the present invention will be described hereinafter with reference to the accompanying drawings.

Figure 1:
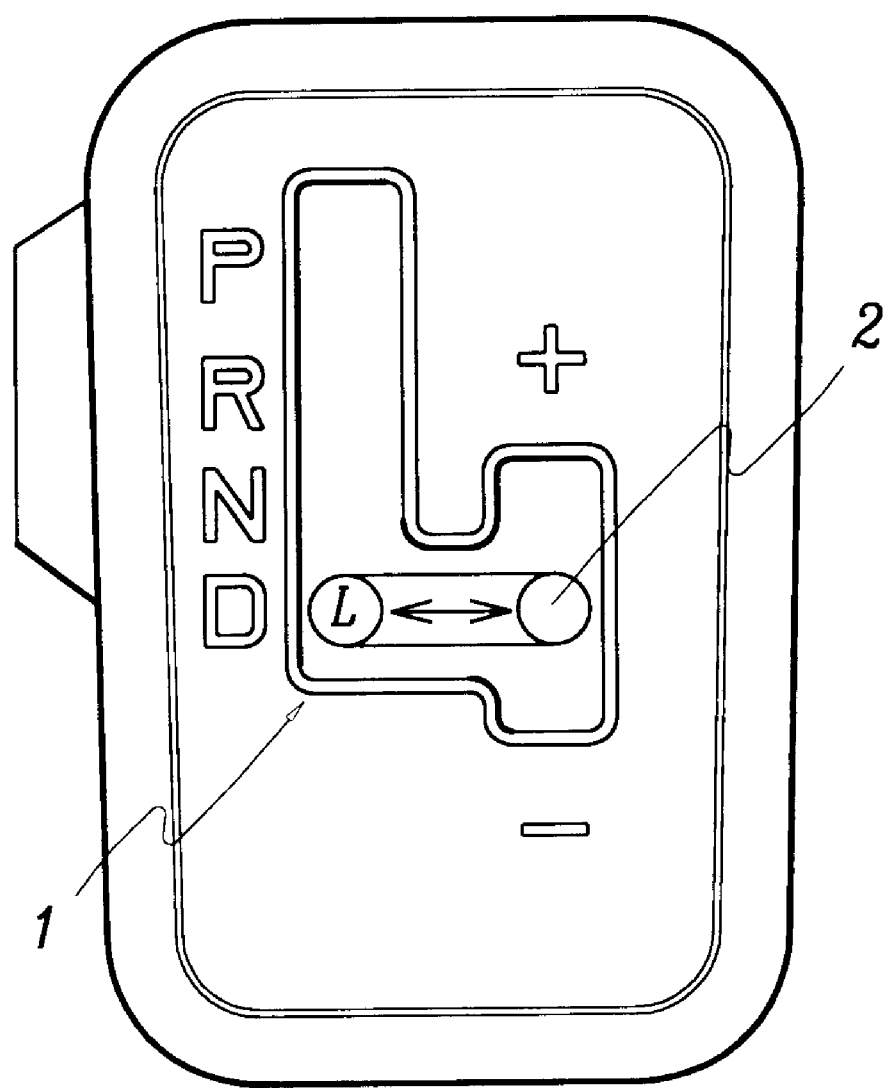
FIG. 1 is a schematic diagram of an indicator panel of a presently used dual mode shift lever unit.
Figure 2:
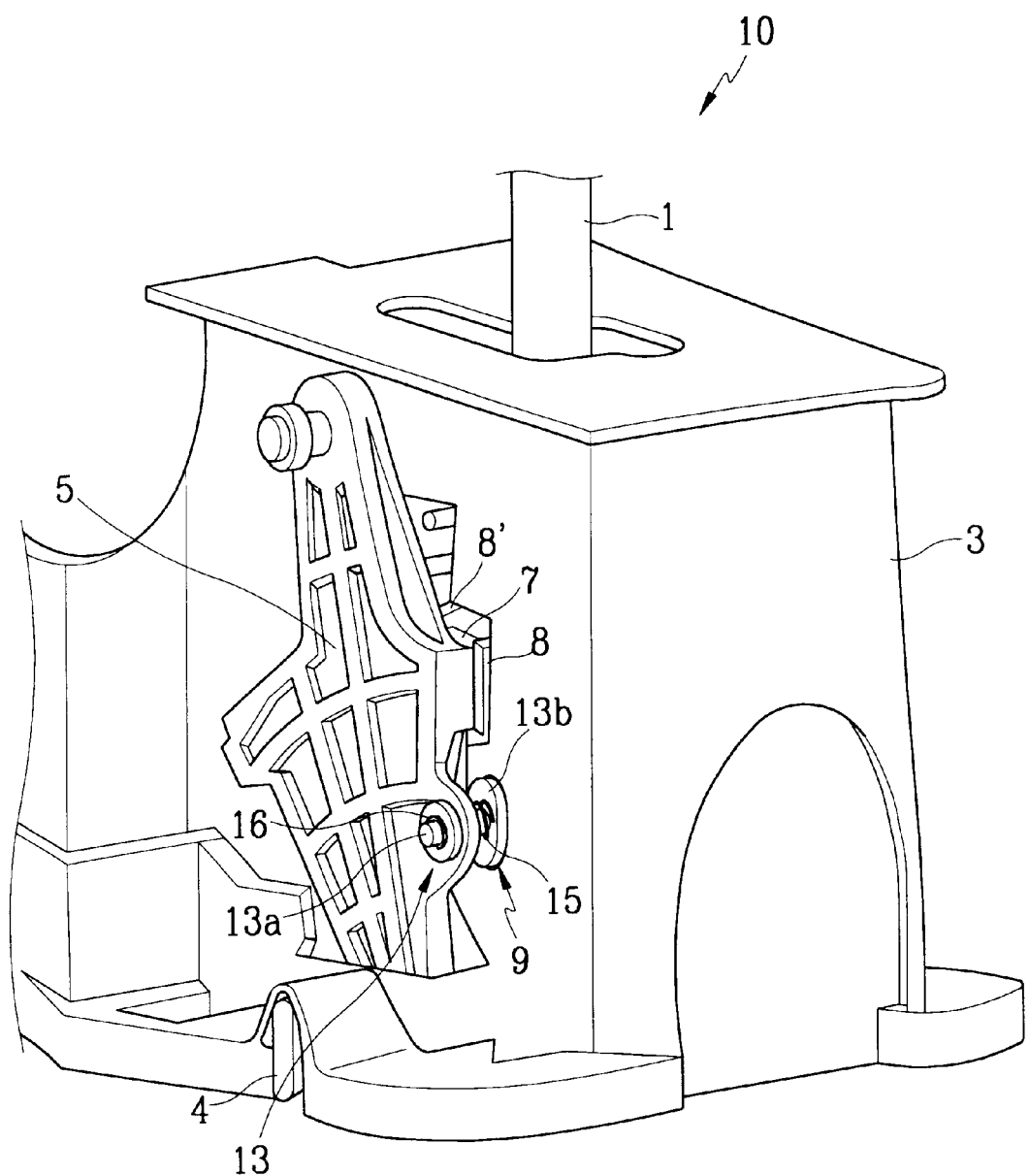
FIG. 2 is a perspective view of a dual mode shift lever unit having a cable block-locking mechanism according to a preferred embodiment of the present invention.
Figure 3:
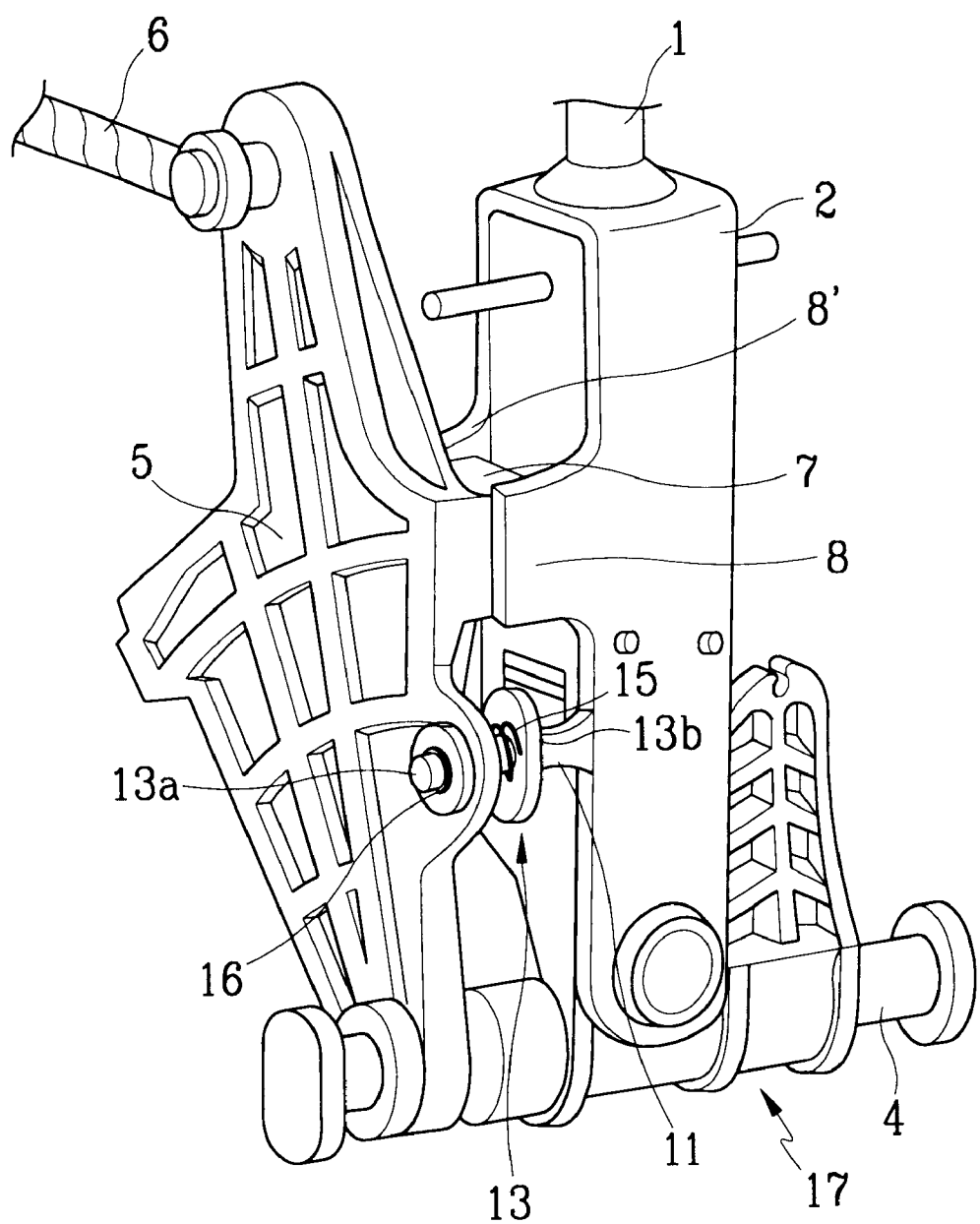
FIG. 3 is a perspective view of the dual mode shift lever unit of FIG. 2 without a shift lever housing.

FIGS. 2 and 3 are perspective views of a dual mode shift lever unit respectively with and without a shift lever housing.

The dual mode shift lever unit 10 comprises a shift lever 1 pivotally connected to a pivot shaft 4 in a lever housing 3 via a lever bracket 2 provided at a lower end of the shift lever 1 and a rotation member 17 rotationally mounted on the pivot shaft 4 and a cable block 5 pivotally mounted on the pivot shaft 4 outside the lever housing 3. The lever housing 3 is provided with a hole 9 on its wall facing the cable block 5 such that the lever bracket 2 and the cable block 5 interact with each other.

The lever bracket 2 is provided with a pair of arms 8 and 8' formed on one side in the middle thereof facing the cable block 5 and pivotally connected at its lower end to the rotation member 17 in a vertical direction relative to the longitudinal axis of the rotation member 17 such that the shift lever 1 can pivot in front, rear, left, and right directions in relation to a vehicle's longitudinal direction.

The cable block 5 is provided with a projection 7 corresponding to the arms 8 and 8' and connected to a manual valve (not shown) of an automatic transmission (not shown) via a cable 6 at its upper end so as to operate the manual valve by shift lever manipulation in the automatic mode in which the lever bracket 2 is locked to the cable block 5 by receiving the projection 7 of the cable block 5 between a pair of arms 8 and 8' formed on one side of the lever bracket 2.

Figure 4:
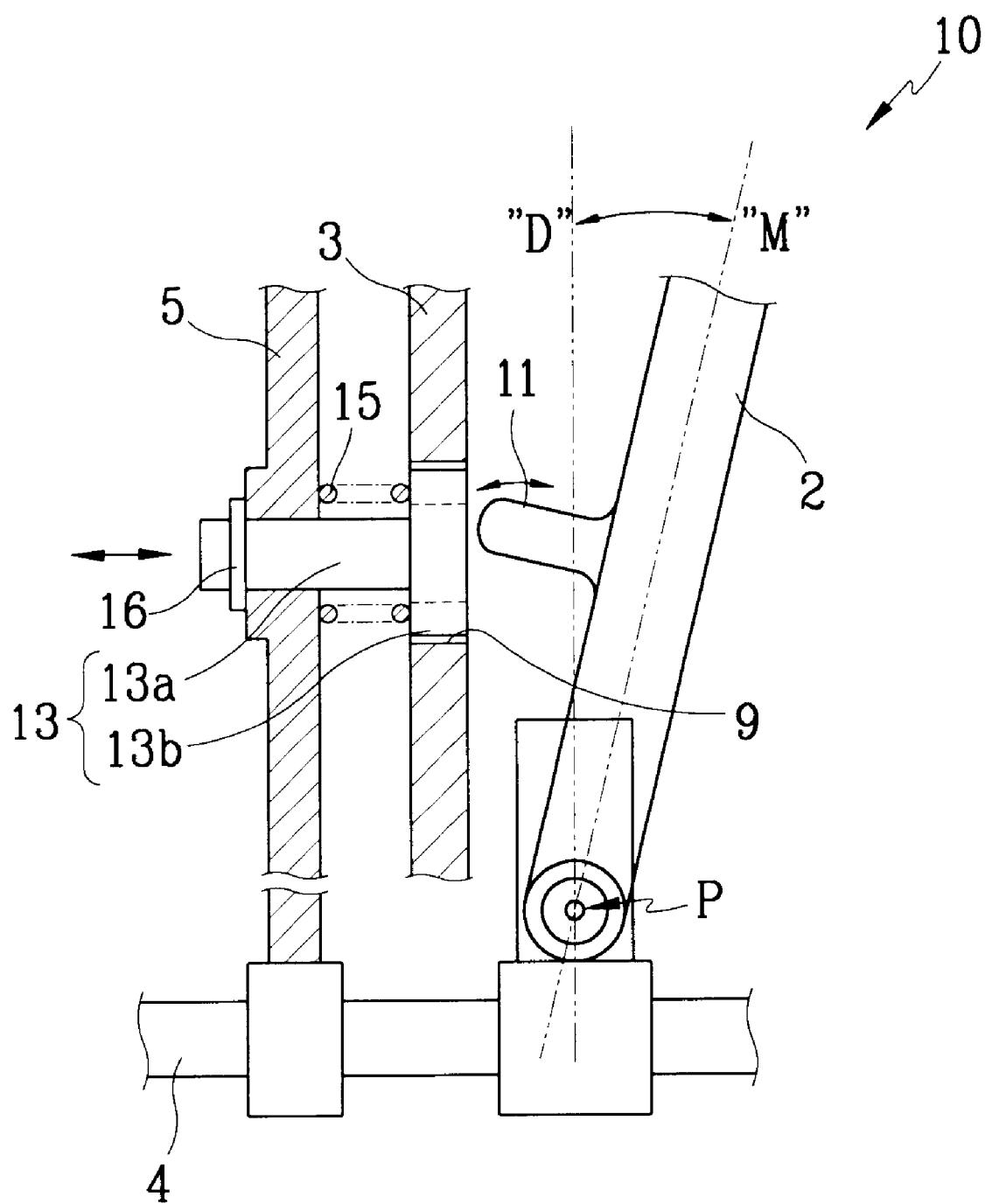
FIG. 4 is an operational view showing behavior of a cable block-locking mechanism of the dual mode shift lever unit of FIG. 2.

As shown in FIG. 4, the dual mode shift lever unit 10 has a cable block-locking mechanism. The cable block-locking mechanism comprises a stud 13 having a shape of a mushroom with a stem 13a and a head 13b such that the stem 13a is slidably inserted into a hole formed on the cable block 5 and the head 13b is received into a hole 9 formed on the lever housing 3, a push rod 11 correspondingly formed on the lever bracket 2 so as to push the stud 13 to a location corresponding to the automatic mode, and a return spring 15 mounted around the stem 13a of the stud 13 for returning the head 13b of the stud 13 to the hole 9 when the automatic mode is converted to the manual mode. The stud 13 is provided with a stopper ring 16 formed around an end portion thereof for preventing the stud from being separated from the hole of the cable block 5. The operation of the cable block-locking mechanism according to the preferred embodiment of the present invention will be described hereinbelow.

Normally, in the automatic mode, the shift lever 1 is pivoted in the direction D on the pivot axis P such that the projection 7 of the cable block 5 is fitted between the arms 8 and 8' of the lever bracket, and at the same time the push rod 11 of the lever bracket 2 pushes the head 13b of the stud 13. Accordingly, the stud head 13b is separated from the hole 9 of the lever housing 3 such that the cable block 5 can freely pivot on the shaft 4 according to the shift lever manipulation.

On the other hand, if the shift mode is converted from the automatic mode to the manual mode, the shift lever 1 is pivoted in the direction M on the pivot axis P in the drive range. In this case, the projection 7 of the cable block 5 is separated from the arms 8 and 8' of the lever bracket, and the push rod 11 of the lever bracket 2 is retreated such that the stud head 13b is inserted into the hole 9 of the lever housing 3 by the elastic force of the return spring 15. As a result, the cable block 5 engages the lever housing and it is locked in the drive range.

As described above, in the dual mode shift lever unit adopting the cable block-locking mechanism of the present invention, since the cable block is locked by the stud which interengages the cable block and the lever housing at the drive range in the manual shift mode, this mechanism provides a reliable lock even when the vehicle experiences exterior impacts.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. An automotive dual mode shift lever unit comprising:

a lever housing;

a lever bracket mounted at a lower end of a shift lever for pivotally connecting the shift lever to a pivot shaft in the lever housing;

a cable block pivotally mounted on the pivot shaft outside the lever housing; and a cable block-locking mechanism interposed between the lever bracket and the cable block, wherein the cable block locking mechanism comprises:

a stud slidably mounted to the cable block for selectively connecting the cable block with the lever housing;

a push rod formed on the lever bracket for depressing the stud so as to release the cable block from the lever housing in an automatic mode; and a return spring mounted around the stud for returning the stud such that a the cable block is coupled to the lever housing in a manual mode.

2. An automotive dual mode shift lever unit of claim 1 wherein the stud is provided with a stud head such that the return spring is elastically interposed between the stud head and the cable block.

3. An automotive dual mode shift lever unit of claim 1 wherein the lever housing is provided with a hole for receiving the stud head in manual mode.

4. An automotive dual mode shift lever unit of claim 1 wherein the stud is provided with a stopper ring for preventing the stud from being separated from the cable block.

* * * * *